(12) United States Patent
Kobayashi et al.

(10) Patent No.: US 12,513,594 B2
(45) Date of Patent: Dec. 30, 2025

(54) REMOTE MONITORING SYSTEM, ROUTE-PROVIDING APPARATUS, AND ROUTE-PROVIDING METHOD

(71) Applicant: NEC Corporation, Tokyo (JP)

(72) Inventors: Kosei Kobayashi, Tokyo (JP); Takanori Iwai, Tokyo (JP); Yusuke Shinohara, Tokyo (JP); Koichi Nihei, Tokyo (JP); Masayuki Sakata, Tokyo (JP); Takashi Yamane, Tokyo (JP)

(73) Assignee: NEC CORPORATION, Tokyo (JP)

( * ) Notice: Subject to any disclaimer, the term of this patent is extended or adjusted under 35 U.S.C. 154(b) by 422 days.

(21) Appl. No.: 18/014,397

(22) PCT Filed: Jul. 7, 2020

(86) PCT No.: PCT/JP2020/026563
§ 371 (c)(1),
(2) Date: Jan. 4, 2023

(87) PCT Pub. No.: WO2022/009309
PCT Pub. Date: Jan. 13, 2022

(65) Prior Publication Data
US 2023/0262575 A1 Aug. 17, 2023

(51) Int. Cl.
*H04W 4/00* (2018.01)
*H04W 24/10* (2009.01)
(Continued)

(52) U.S. Cl.
CPC ........... *H04W 40/20* (2013.01); *H04W 24/10* (2013.01); *H04W 40/12* (2013.01)

(58) Field of Classification Search
CPC ...... H04W 40/20; H04W 24/10; H04W 40/12
See application file for complete search history.

(56) References Cited

U.S. PATENT DOCUMENTS

| | | | |
|---|---|---|---|
| 2012/0190339 A1* | 7/2012 | Abe | H04W 48/16 455/411 |
| 2012/0238297 A1* | 9/2012 | Nakagawa | H04W 72/54 455/456.5 |

(Continued)

FOREIGN PATENT DOCUMENTS

| | | |
|---|---|---|
| JP | H10-019591 A | 1/1998 |
| JP | 2013-140123 A | 7/2013 |

(Continued)

OTHER PUBLICATIONS

International Search Report for PCT Application No. PCT/JP2020/026563, mailed on Sep. 15, 2020.

(Continued)

*Primary Examiner* — Abdelnabi O Musa
(74) *Attorney, Agent, or Firm* — Sughrue Mion, PLLC

(57) ABSTRACT

The moving body receives data from a remote monitoring apparatus and transmits data to the remote monitoring apparatus, via the wireless communication network. A candidate route acquisition unit acquires a candidate route of the moving body to a destination. A communication quality evaluation unit evaluates communication quality of the wireless communication network at each location included in the candidate route for each direction of communication by using communication quality information for each direction of communication. A candidate route evaluation unit evaluates communication stability of the candidate route by using communication quality evaluated for each direction of communication. A route determination unit determines a movement route of the moving body among the candidate routes by using an evaluation result of the communication stability.

22 Claims, 12 Drawing Sheets

(51) Int. Cl.
*H04W 40/12* (2009.01)
*H04W 40/20* (2009.01)

(56) References Cited

U.S. PATENT DOCUMENTS

| | | | |
|---|---|---|---|
| 2012/0287807 A1* | 11/2012 | Yamasaki | H04W 40/12 370/252 |
| 2015/0181374 A1* | 6/2015 | Tsuda | H04W 4/02 455/457 |
| 2020/0037107 A1 | 1/2020 | Kusumoto | |
| 2020/0057436 A1* | 2/2020 | Boda | G08G 1/09 |
| 2021/0409650 A1* | 12/2021 | Kobayashi | G08G 1/0129 |
| 2022/0144257 A1* | 5/2022 | Maeda | B60W 60/0016 |

FOREIGN PATENT DOCUMENTS

| | | |
|---|---|---|
| JP | 2016-053518 A | 4/2016 |
| JP | 2016-066936 A | 4/2016 |
| JP | 2018-014684 A | 1/2018 |
| WO | 2018/087879 A1 | 5/2018 |
| WO | 2018/164086 A1 | 9/2018 |

OTHER PUBLICATIONS

JP Office Action for JP Application No. 2022-534534, mailed on Apr. 2, 2024 with English Translation.
Yuichi Sudo et al., "Optimal Longcut Route Selection for Wireless Mobile Users", IEICE Technical Report, Japan, The Institute of Electronics, Information and Communication Engineers, Mar. 2010, pp. 71-pp. 76.
JP Official Communication for JP Application No. 2022-534534, mailed on Jul. 30, 2024 with English Translation.

\* cited by examiner

REMOTE MONITORING SYSTEM, ROUTE-PROVIDING APPARATUS, AND ROUTE-PROVIDING METHOD

This application is a National Stage Entry of PCT/JP2020/026563 filed on Jul. 7, 2020, the contents of all of which are incorporated herein by reference, in their entirety.

TECHNICAL FIELD

The present disclosure relates to a remote monitoring system, a route providing apparatus, and a route providing method.

BACKGROUND ART

Technological development of an automatic vehicle is being more active, and a driving test on a public road and trial operation of the automatic vehicle are being promoted domestically and internationally. In order to ensure safety of an automatic vehicle, there is an increasing need for remote monitoring of the automatic vehicle using mobile communication and remote control in occurring of an unexpected accident. In order to achieve safe and efficient remote monitoring and remote control, it is required to stably transmit a video captured by an in-vehicle camera or the like to a monitoring apparatus via a mobile network.

For video transmission from a vehicle to a monitoring apparatus, video distribution control being matched with a communication band of a mobile network, such as an adaptive bitrate (ABR) streaming technique, can be used. For example, in a moving picture experts group-dynamic adaptive streaming over hyper text transfer protocol (HTTP) (MPEG-DASH), a video is divided into units referred to as segments, and a result of encoding at a plurality of bit rates for each segment is prepared. An apparatus that receives a video, such as a monitoring apparatus, can specify a bit rate of a segment to be received next according to a communication speed at a time of receiving the video.

By using the above-described video distribution control, the monitoring apparatus can receive a video with video quality being matched to a communication band of a mobile network. For example, when the communication band of the mobile network is secured, the monitoring apparatus can receive a video captured by an in-vehicle camera with high video quality. However, in a place where radio quality of the mobile network is extremely poor, a congested area where a lot of wireless terminals are connected to the mobile network, or the like, there is a possibility that a minimum communication band required for remote monitoring cannot be acquired. When a vehicle travels in such a place, it is difficult to safely perform remote monitoring or control.

As a related technique, Patent Literature 1 discloses a remote control system that remotely controls a vehicle. The remote control system described in Patent Literature 1 receives an image from a vehicle, and displays the received image. A remote operator remotely operates the vehicle while viewing the image. The remote control system determines whether a communication failure occurrence prediction position is included in a route on which the vehicle is to travel. Herein, the communication failure occurrence prediction position refers to a position where a communication failure is predicted to occur due to a poor communication environment, such as a tunnel, a valley of buildings, and an underground. The remote control system changes a route in such a way as to avoid the communication failure occurrence prediction position when the communication failure occurrence prediction position is included in a rule on which the vehicle is to travel.

As another related technique, Patent Literature 2 discloses a technique for performing a route display according to a network state. In Patent Literature 2, a user outputs a search request to a service center. The search request includes geographic information of a current location and a destination, and information indicating request quality for wireless communication performed during movement. The service center extracts a candidate of a movement route to a destination (a movement route candidate) from among a plurality of routes included in map information. A server estimates, for each movement route candidate extracted by the service center, a network state on the movement route candidate. In addition, the server determines whether a congestion section that does not satisfy communication quality requested by a user is included in the movement route candidate. A mobile terminal receives a movement route candidate and information indicating presence or absence of the congestion section for each movement route candidate. The mobile terminal presents, to a user, the received movement route candidate and information indicating presence or absence of the congestion section. The user selects a movement route from the movement route candidate.

CITATION LIST

Patent Literature

[Patent Literature 1] International Patent Publication No. WO2018/087879
[Patent Literature 2] Japanese Unexamined Patent Application Publication No. 2016-53518

SUMMARY OF INVENTION

Technical Problem

Herein, in wireless communication, communication quality of uplink communication and communication quality of downlink communication are generally independent. Remote control of a vehicle includes (1) communication for remote monitoring of a control target object (vehicle) (uplink communication from the vehicle to a remote server), and (2) communication for control instruction from the remote server to the control target object (downlink communication from the remote server to the vehicle). In remote control, a requested communication quality requirement may be different between uplink communication and downlink communication. However, Patent Literatures 1 and 2 do not consider a difference in communication characteristics between uplink communication and downlink communication. For this reason, these related techniques may not be able to provide a route suitable for remote control requiring bidirectional communication.

In view of the above-described circumstances, an object of the present disclosure is to provide a remote monitoring system, a route providing apparatus, and a method that are capable of providing a route being able to stably perform uplink and downlink communication with respect to a moving body communicating with a server via a wireless communication network.

Solution to Problem

In order to achieve the above-described object, the present disclosure provides a route providing apparatus including: a candidate route acquisition means for acquiring, with respect to a moving body that receives data from a server and transmits data to the server via a wireless communication network, a candidate route of the moving body to a destination: a communication quality evaluation means for evaluating communication quality of the wireless communication network at each location included in the candidate route for each direction of communication by using communication quality information for each direction of communication: a candidate route evaluation means for evaluating communication stability of the candidate route by using communication quality being evaluated for each direction of the communication; and a route determination means for determining a movement route of the moving body from among the candidate routes by using an evaluation result of the communication stability.

The present disclosure provides a remote monitoring system including: a remote monitoring apparatus configured to transmit data to a moving body and receive data from the moving body via a wireless communication network; and a route providing apparatus configured to provide a movement route to the moving body. In the remote monitoring system, the route providing apparatus includes: a candidate route acquisition means for acquiring a candidate route of the moving body to a destination: a communication quality evaluation means for evaluating communication quality of the wireless communication network at each location included in the candidate route for each direction of communication by using communication quality information for each direction of communication: a candidate route evaluation means for evaluating communication stability of the candidate route by using communication quality being evaluated for each direction of the communication; and a route determination means for determining a movement route of the moving body from among the candidate routes by using an evaluation result of the communication stability.

The present disclosure provides a route providing method including: acquiring, with respect to a moving body that receives data from a server and transmits data to the server via a wireless communication network, a candidate route of the moving body to a destination: evaluating communication quality of the wireless communication network at each location included in the candidate route for each direction of communication by using communication quality information for each direction of communication: evaluating communication stability of the candidate route by using communication quality being evaluated for each direction of the communication; and determining a movement route of the moving body from among the candidate routes by using an evaluation result of the communication stability.

Advantageous Effects of Invention

A remote monitoring system, a route providing apparatus, and a method according to the present disclosure are able to provide a route being able to stably perform uplink and downlink communication with respect to a moving body communicating with a server via a wireless communication network.

EXAMPLE EMBODIMENT

Figure 1:
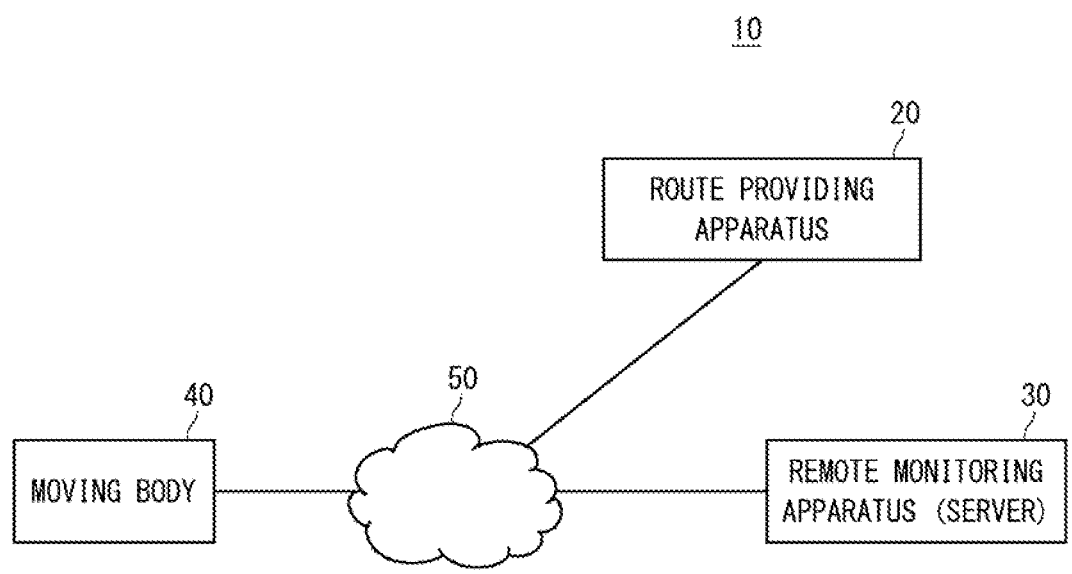
FIG. 1 is a block diagram schematically illustrating a remote monitoring system according to the present disclosure.

Prior to an example embodiment of the present disclosure, an outline of the present disclosure will be described. FIG. 1 schematically illustrates a remote monitoring system according to the present disclosure. A remote monitoring system 10 includes a route providing apparatus 20, a remote monitoring apparatus (server) 30, and a moving body 40. The remote monitoring apparatus 30 is an apparatus for remotely monitoring the moving body 40. The remote monitoring apparatus 30 communicates with the moving body 40 via a wireless communication network 50. The remote monitoring apparatus 30 transmits data to the moving body 40 and receives data from the moving body 40 via the wireless communication network 50, and thereby performs bidirectional communication with the moving body 40.

The route providing apparatus 20 provides a movement route to the moving body 40. The route providing apparatus 20 provides a movement route to the moving body 40 via the wireless communication network 50, for example. The route providing apparatus 20 may provide a movement route to the moving body 40 via the remote monitoring apparatus 30 and the wireless communication network 50. The route providing apparatus 20 may be a part of the remote monitoring apparatus 30. Alternatively, the route providing apparatus 20 may be mounted on the moving body 40, and may provide a movement route to the moving body 40 without passing through the wireless communication network 50.

Figure 2:
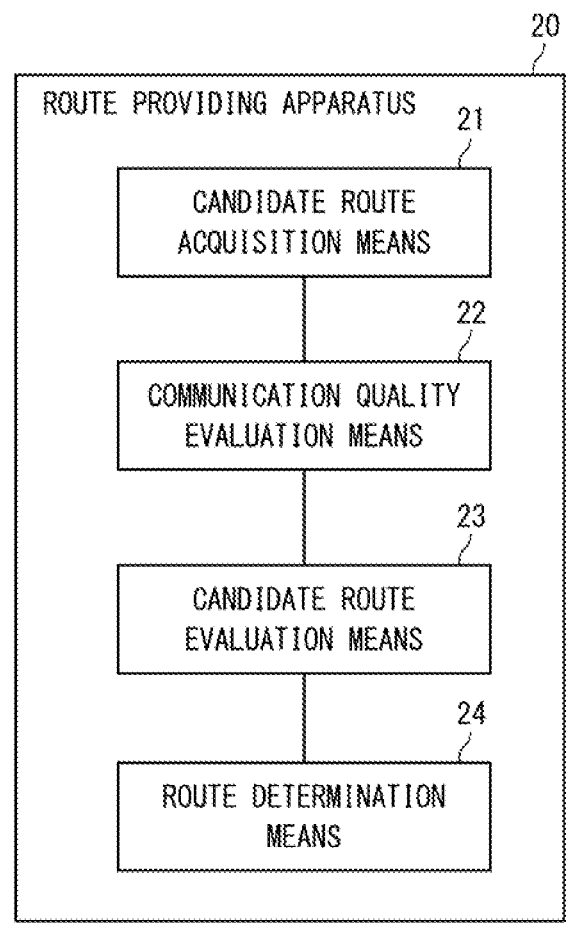
FIG. 2 is a block diagram schematically illustrating a route providing apparatus according to the present disclosure.

FIG. 2 schematically illustrates a route providing apparatus. The route providing apparatus 20 includes a candidate route acquisition means 21, a communication quality evaluation means 22, a candidate route evaluation means 23, and a route determination means 24. The candidate route acquisition means 21 acquires a candidate route to a destination of the moving body 40. The communication quality evaluation means 22 evaluates communication quality of the wireless communication network 50 at each location included in the candidate route. The communication quality evaluation means 22 evaluates communication quality of the wireless communication network at each location included in the candidate route for each direction of communication by using communication quality information for each direction of communication.

The candidate route evaluation means 23 evaluates communication stability of the candidate route by using the communication quality evaluated for each direction of communication. The route determination means 24 determines a movement route of the moving body 40 from among the candidate routes by using an evaluation result of the communication stability.

Figure 3:
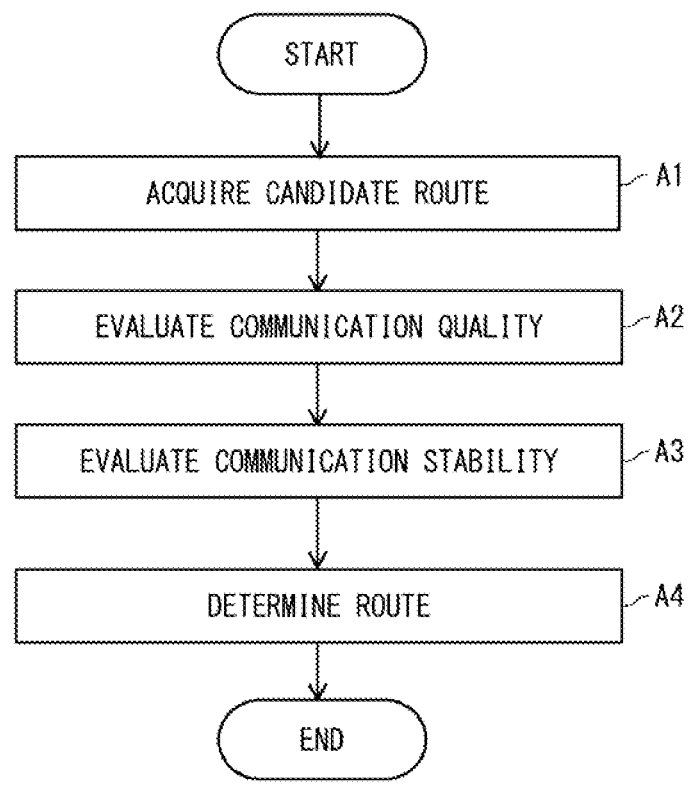
FIG. 3 is a flowchart illustrating an operation procedure of the route providing apparatus.

Subsequently, an operation procedure (route providing method) of the route providing apparatus 20 will be described. FIG. 3 illustrates the operation procedure of the route providing apparatus 20. The candidate route acquisition means 21 acquires, for the moving body 40, a candidate route being a candidate of a movement route to a destination of the moving body 40 (step A1). The communication quality evaluation means 22 evaluates communication quality of the wireless communication network at each location included in the candidate route for each direction of communication by using communication quality information for each direction of communication (step A2). The candidate route evaluation means 23 evaluates communication stability of the candidate route by using the communication quality evaluated for each direction of communication (step A3). The route determination means 24 determines a movement route of the moving body 40 from among the candidate routes by using an evaluation result of the communication stability (step A4).

In the present disclosure, the communication quality evaluation means 22 evaluates communication quality of each location included in a candidate route for each direction of communication. The candidate route evaluation means 23 evaluates communication stability of the candidate route by using communication quality evaluated for each direction of communication. In the communication between the remote monitoring apparatus 30 and the moving body 40, there is a case where a required communication quality requirement is different between uplink communication and downlink communication. In the present disclosure, communication quality is evaluated for each direction of communication. Therefore, the route providing apparatus 20 can provide the moving body 40 with a route being capable of stably performing uplink and downlink communication.

Figure 4:
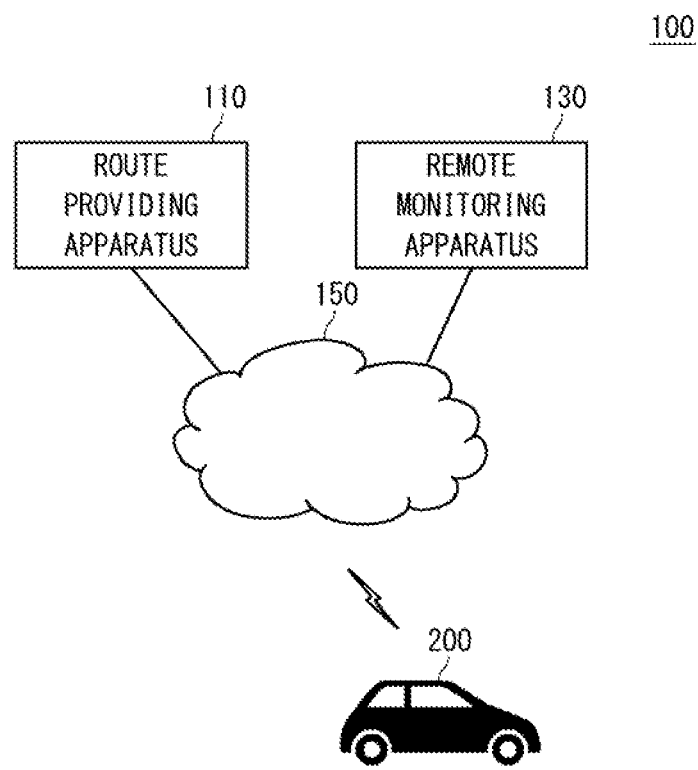
FIG. 4 is a block diagram illustrating a remote monitoring system according to one example embodiment of the present disclosure.

Hereinafter, an example embodiment of the present disclosure will be described in detail. FIG. 4 illustrates a remote monitoring system according to one example embodiment of the present disclosure. A remote monitoring system 100 includes a route providing apparatus 110, a remote monitoring apparatus 130, and a moving body 200. The remote monitoring apparatus 130 is an apparatus for remotely monitoring the moving body 200. The remote monitoring apparatus 130 may be remotely controllable of the moving body 200. The route providing apparatus 110 is an apparatus for providing a movement route to a destination to the moving body 200. The route providing apparatus 110 corresponds to the route providing apparatus 20 illustrated in FIG. 1. The remote monitoring apparatus 130 corresponds to the remote monitoring apparatus 30 illustrated in FIG. 1.

Each of the route providing apparatus 110 and the remote monitoring apparatus 130 is connected to the moving body 200 via a network 150. The network 150 includes, for example, a wireless communication network using a communication line standard such as long term evolution (LTE). The network 150 may include a wireless communication network such as a WiFi (registered trademark) or a fifth generation mobile communication system. The network 150 corresponds to the wireless communication network 50 illustrated in FIG. 1.

Note that, an example in which the route providing apparatus 110 and the moving body 200 communicate with each other via the network 150 has been described above, the present disclosure is not limited thereto. The route providing apparatus 110 may communicate with the moving body 200 via the remote monitoring apparatus 130 and the network 150. In addition, the route providing apparatus 110 and the remote monitoring apparatus 130 are not necessarily configured as individual apparatuses, and the route providing apparatus 110 may be configured as a part of the remote monitoring apparatus 130.

In place of the above description, the route providing apparatus 110 may be mounted on the moving body 200. In such a case, the route providing apparatus 110 may directly communicate with the moving body 200 without passing through the network 150.

The moving body 200 is performed remote monitoring by the remote monitoring apparatus 130. The moving body 200 is configured as a land vehicle such as an automobile, a bus, a taxi, or a truck. The moving body 200 may be configured to be capable of automatic driving (autonomous driving), based on information of a sensor mounted on the moving body. In addition, the moving body 200 may be a railroad, a ship, or an airplane, or may be a moving-type robot such as an automated guided vehicle (AGV). The moving body 200 corresponds to the moving body 40 illustrated in FIG. 1.

Figure 5:
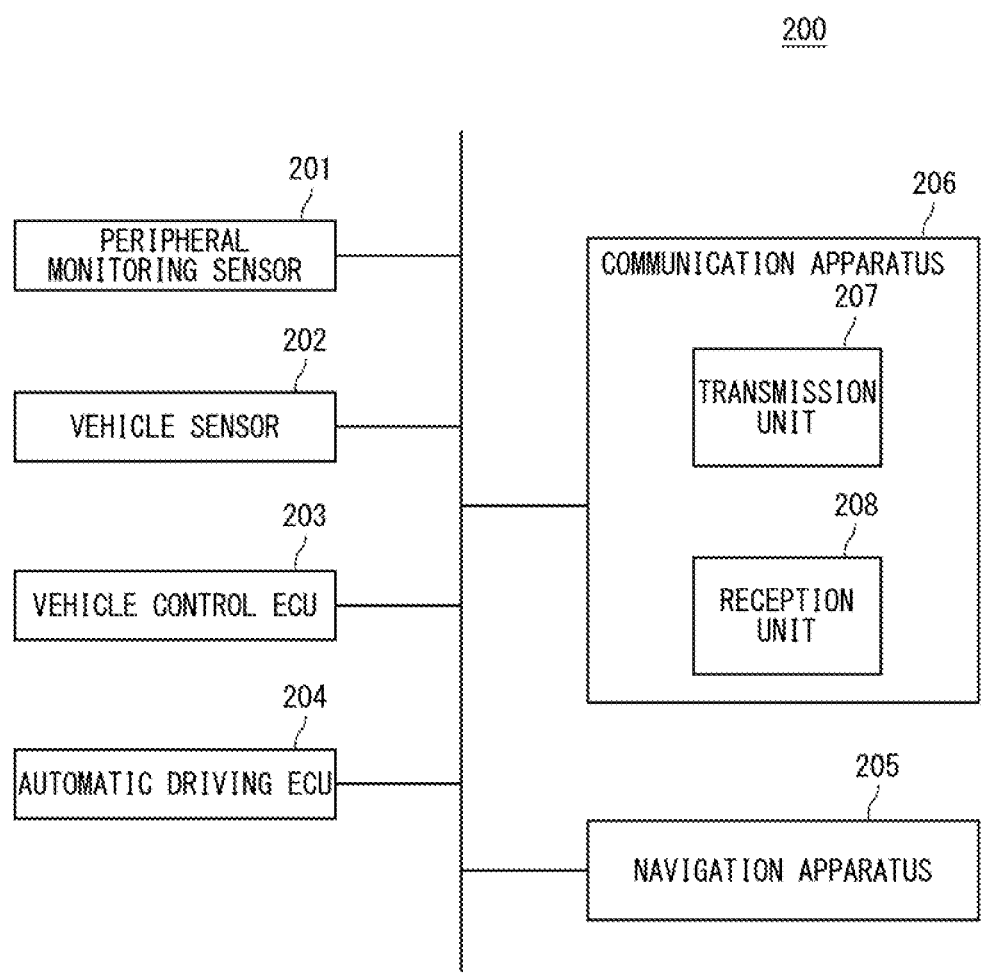
FIG. 5 is a block diagram illustrating a configuration example of a moving body.

FIG. 5 illustrates a configuration example of the moving body 200. The moving body 200 includes a peripheral monitoring sensor 201, a vehicle sensor 202, a vehicle control electric control unit (ECU) 203, an automatic driving ECU 204, a navigation apparatus 205, and a communication apparatus 206. In the moving body 200, these components are configured to be communicable with one another via an in-vehicle local area network (LAN), a controller area network (CAN), and the like.

The peripheral monitoring sensor 201 is a sensor that monitors a peripheral situation of the moving body 200. The peripheral monitoring sensor 201 includes, for example, a camera, a radar, a light detection and ranging (LiDAR), and the like. The peripheral monitoring sensor 201 may include, for example, a plurality of cameras that capture an image of a front, a back, a right side, and a left side of a vehicle. The peripheral monitoring sensor 201 may include a camera that captures an image of the inside of the moving body 200.

The vehicle sensor 202 is a sensor for detecting various states of the moving body 200. The vehicle sensor 202 includes, for example, a sensor such as a vehicle speed sensor that detects a vehicle speed, a steering sensor that detects a steering angle, an accelerator opening sensor that detects an opening degree of an accelerator pedal, and a brake depression force sensor that detects a depression amount of a brake pedal.

The vehicle control ECU 203 is an electronic control unit that performs travel control and the like of the moving body 200. Generally, an electronic control unit includes a processor, a memory, an input/output (I/O), and a bus connecting therewith. The vehicle control ECU 203 performs various pieces of control such as, for example, control of a fuel injection amount, control of an engine ignition timing, and control of an assist amount of a power steering, based on sensor information being output from the vehicle sensor 202.

The automatic driving ECU 204 is an electronic control unit that controls automatic driving of the moving body 200. The automatic driving ECU 204 acquires sensor information from the peripheral monitoring sensor 201 and the vehicle sensor 202, and controls autonomous traveling of the moving body 200, based on the acquired sensor information.

The communication apparatus 206 is configured as an apparatus that performs wireless communication between the moving body 200 and the network 150 (see FIG. 4). The communication apparatus 206 includes, as a hardware configuration, an antenna for wireless communication, a transmitter, and a receiver. In addition, the communication apparatus 206 includes a processor, a memory, an I/O, and a bus connecting therewith. A function of each unit in the communication apparatus 206 are achieved by, for example, executing a control program stored in the memory by the processor.

The communication apparatus 206 includes a transmission unit 207 and a reception unit 208. The transmission unit 207 transmits various information to the remote monitoring apparatus 130 via the network 150. For example, the transmission unit 207 acquires a camera video acquired by the peripheral monitoring sensor 201, and transmits the acquired camera video to the remote monitoring apparatus 130 via the network 150. The transmission unit 207 may acquire sensor information acquired by the vehicle sensor 202, and transmit the acquired sensor information to the remote monitoring apparatus 130 via the network 150. For example, the transmission unit 207 may transmit vehicle speed information acquired by the vehicle sensor 202 to the remote monitoring apparatus 130 via the network 150. Note that, the transmission unit 207 may transmit various information such as information acquired by the peripheral monitoring sensor 201 and information acquired by the vehicle sensor 202 to the route providing apparatus 110 via the network 150.

The reception unit 208 receives, for example, information related to control of the moving body 200 from the remote monitoring apparatus 130 via the network 150. The reception unit 208 receives, from the remote monitoring apparatus 130, remote control information being, for example, information for performing remote control on the moving body 200. The remote control information includes, for example, information indicating an accelerator opening degree, an operation amount of a steering wheel, a depression amount of a brake pedal, and the like. When receiving the remote control information, the reception unit 208 transmits the received remote control information to the vehicle control ECU 203 via the in-vehicle LAN or the like. The vehicle control ECU 203 controls the moving body 200, based on the received remote control information.

In addition, the reception unit 208 may receive, from the remote monitoring apparatus 130, automatic driving control information being information for controlling automatic driving being performed in the moving body 200. The automatic driving control information includes information such as a parameter to be set in the automatic driving ECU 204, for example. When receiving the automatic driving control information, the reception unit 208 transmits the received automatic driving control information to the automatic driving ECU 204 via the in-vehicle LAN or the like. The automatic driving ECU 204 performs the automatic driving of the moving body 200 by using the received parameter and the like.

The navigation apparatus 205 displays a current position of the moving body 200, a map around the moving body 200, a route on which the moving body 200 travels, and the like. The navigation apparatus 205 includes, for example, a processor, a memory, a storage device, a global navigation satellite system (GNSS) receiver, a display apparatus, a touch panel, a key, and the like, similarly to a typical car navigation apparatus. For example, when a user operates the touch panel and selects a route search from a menu, the navigation apparatus 205 transmits a route search request to the route providing apparatus 110 (see FIG. 4) via the communication apparatus 206. The route search request includes, for example, position information of the moving body 200 acquired by using the GNSS, and position information of a destination. The route providing apparatus 110 provides the moving body 200 with a route through which the remote monitoring apparatus 130 can perform remote monitoring on the moving body 200 in a stable manner.

Note that, although an example in which the navigation apparatus 205 is disposed on the moving body 200 as an independent apparatus has been described above, the present disclosure is not limited thereto. For example, all or a part of functions of the navigation apparatus 205 may be incorporated in the automatic driving ECU 204, for example. For example, the automatic driving ECU 204 transmits a route search request to the route providing apparatus 110 when acquiring a movement route to a destination. The automatic driving ECU 204 may cooperate with the route providing apparatus 110, and thereby perform automatic driving on the moving body 200 to the destination according to the movement route provided by the route providing apparatus 110.

In addition, the navigation apparatus 205 may include a wireless communication means different from the communication apparatus 206. In such a case, the wireless communication means included in the navigation apparatus 205 may be used to transmit the route search request to the route providing apparatus 110 and to receive the movement route from the route providing apparatus 110 as described above. In addition, the route search request may include, in addition to the above-described position information of the moving body 200 and the position information of the destination, a communication quality requirement for each direction of communication, a current time, and a departure time when movement to the destination is started.

Figure 6:
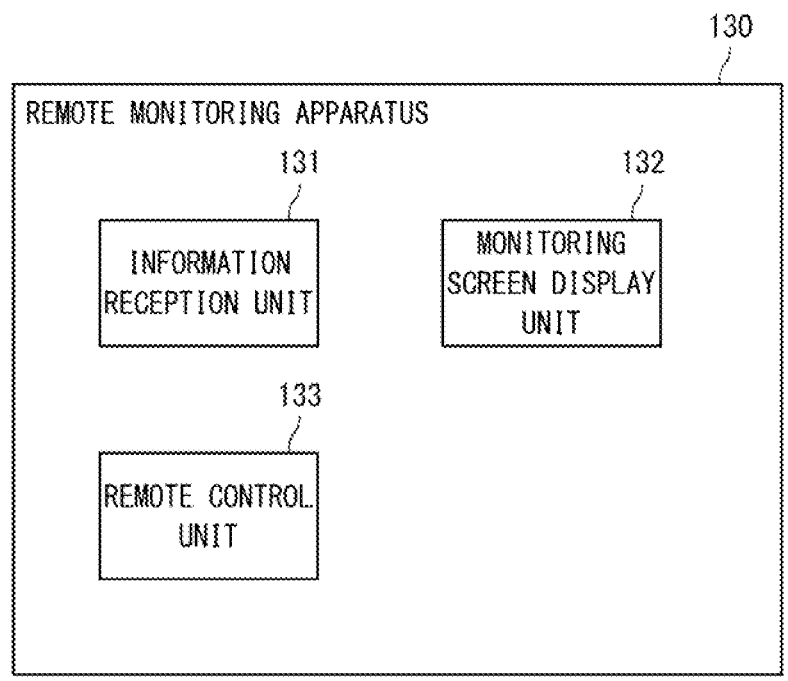
FIG. 6 is a block diagram illustrating a configuration example of a remote monitoring apparatus.

FIG. 6 illustrates a configuration example of the remote monitoring apparatus 130. The remote monitoring apparatus 130 includes an information reception unit 131, a monitoring screen display unit 132, and a remote control unit 133. The information reception unit 131 receives information transmitted from the transmission unit 207 of the moving body 200 via the network 150 (see FIG. 4). The information reception unit 131 receives, from the moving body 200, video data captured by the peripheral monitoring sensor 201. In addition, the information reception unit 131 receives, from the moving body 200, sensor information acquired by the vehicle sensor 202. The monitoring screen display unit 132 displays the information received by the information reception unit 131 on a display screen. The monitoring screen display unit 132 displays, for example, traveling video data of the moving body 200 and various information such as a vehicle speed, on the display screen. A monitoring person monitors operation of the moving body 200 by viewing the display screen.

The remote control unit 133 transmits information for remotely controlling the moving body 200 to the moving body 200 via the network 150. The remote control unit 133 includes equipment for remotely operating a vehicle, such as a steering wheel, an accelerator pedal, and a brake pedal. A monitoring person (remote driver) performs operation of a steering wheel or the like while viewing a screen displayed by the monitoring screen display unit 132. The remote control unit 133 transmits information indicating an operation amount of the steering wheel and the like to the moving body 200. The remote control unit 133 may cause a remote driver to select a remote control command such as a right turn start or an emergency stop. When a remote driver selects a remote control command, the remote control unit 133 may transmit the remote control command to the moving body 200. Further, the remote control unit 133 may transmit information indicating a parameter of the automatic driving to the moving body 200.

Figure 7:
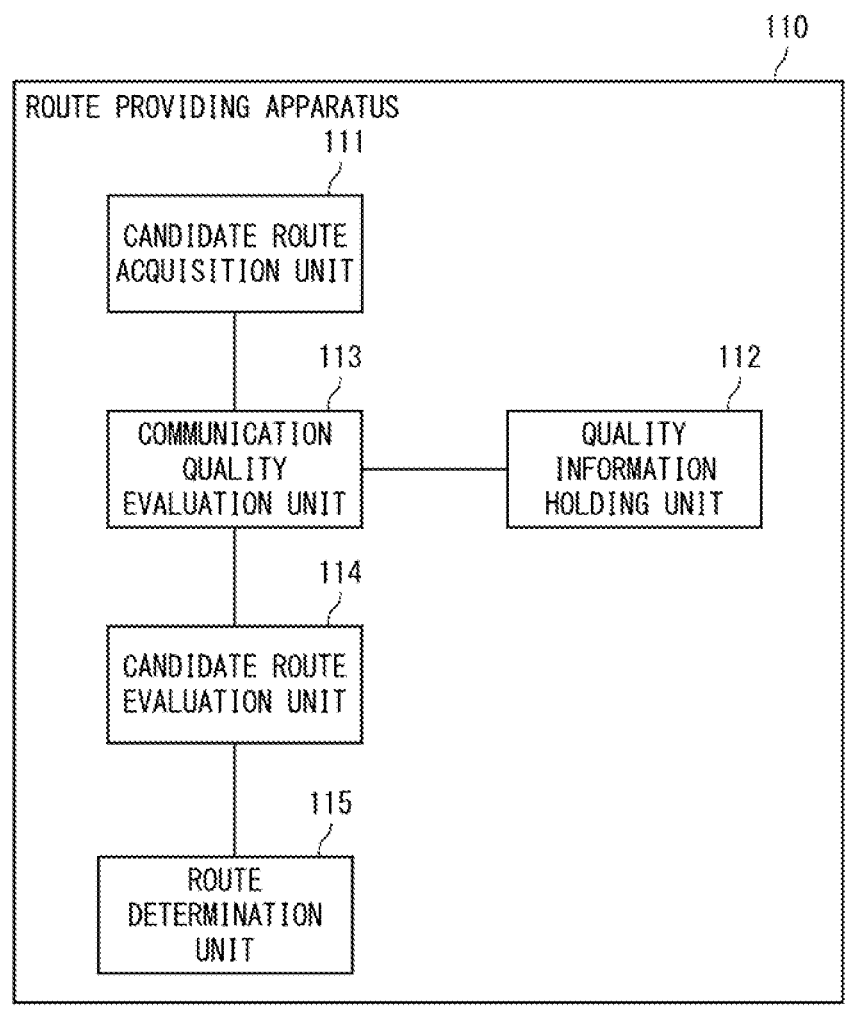
FIG. 7 is a block diagram illustrating a configuration example of the route providing apparatus.

FIG. 7 illustrates a configuration example of the route providing apparatus 110. The route providing apparatus 110 includes a candidate route acquisition unit 111, a quality information holding unit 112, a communication quality evaluation unit 113, a candidate route evaluation unit 114, and a route determination unit 115. Note that, each element in the route providing apparatus 110 needs not necessarily be disposed in the physically same apparatus. The candidate route acquisition unit 111, the quality information holding unit 112, the communication quality evaluation unit 113, the candidate route evaluation unit 114, and the route determination unit 115 may be disposed in different apparatuses from one another, and the apparatuses may communicate with one another via a network.

The candidate route acquisition unit 111 acquires a candidate route from a current position of the moving body 200 to a destination of the moving body 200 for the moving body 200 that has transmitted a route search request. The candidate route acquisition unit 111 refers to not-illustrated map information, and extracts, as candidate routes, a predetermined number of routes having a shorter movement time and a shorter movement distance from among routes from a current location to the destination, by using a route search method such as a Dijkstra method, for example. The candidate route acquisition unit 111 may acquire the map information from a storage device in the route providing apparatus 110, or may acquire the map information from an external server that provides the map information via a network. The candidate route acquisition unit 111 corresponds to the candidate route acquisition means 21 illustrated in FIG. 2.

The quality information holding unit 112 stores communication quality information being information related to communication quality of the network 150. The communication quality information includes, for example, information related to at least one of radio quality such as reference signal received power, reference signal received quality, or a signal-to-noise power ratio of a wireless communication network included in the network 150, a communication speed (throughput) of the network 150, a packet loss rate, a jitter, and a communication delay. Note that, in case of an LTE network, the reference signal received power is also referred to as RSRP, and the reference signal received quality is also referred to as RSRQ. The communication quality information may be, for example, a measurement value or an analysis value (including simulation) of each piece of communication quality. For example, a method of acquiring the communication quality by measurement includes, in addition to a method of measuring by using a dedicated measuring instrument, a method of measuring by using an application on a mobile phone or a smart phone, a method of measuring by using a minimization of drive tests (MDT) function defined in 3GPP, and the like. In addition, a method of acquiring the radio quality by analysis includes a radio wave propagation simulation method represented by a ray tracing method and a statistical model method represented by an Okumura-Hata model. The quality information holding unit 112 holds communication quality information for each location and for each direction of communication. As one example, the quality information holding unit 112 holds communication quality information for each region of several tens of meters square being divided into a mesh shape, for example. Note that, in a case where a plurality of communication quality measurement values or analysis values are included in the region, statistical values such as a median value or an average value may be calculated, and the calculated statistical value may be used as a representative value of the region.

For example, the quality information holding unit 112 statically holds communication quality information registered in advance. Alternatively, the quality information holding unit 112 may collect communication quality from a plurality of moving bodies 200 traveling in various locations, and accumulate the collected communication quality as communication quality information. For example, the moving body 200 measures a communication speed, radio quality, and the like of the wireless communication network, and transmits the measured communication speed and the measured radio quality to the route providing apparatus 110. The route providing apparatus 110 holds the communication speed and the radio quality received from the moving body 200 in the quality information holding unit 112 in association with the location.

Herein, the communication quality is influenced by a congestion degree of a base station. Usually, good communication quality is more easily acquired at a time in idle compared with a time in congesting. The congestion degree of a base station may vary depending on time and day of the week. The quality information holding unit 112 may divide one day into a plurality of time periods, and hold quality information for each time period. In addition, the quality information holding unit 112 may hold the quality information for each day of the week. Alternatively, the quality information holding unit 112 may hold the quality information for each of a weekday and a holiday.

In addition, a base station of the wireless communication network is congested when an event in which a large number of persons gather is held. The quality information holding unit 112 may hold, for a specific location, communication quality information in a case where an event is held and communication quality information in a case where an event is not held.

The communication quality evaluation unit 113 refers to the quality information holding unit 112, and evaluates communication quality of each location included in a candidate route acquired by the candidate route acquisition unit 111. More specifically, the communication quality evaluation unit 113 evaluates communication quality of the wireless communication network when the moving body 200 moves on a candidate route for each direction of communication by using communication quality information for each location and for each direction of communication.

The communication quality evaluation unit 113 acquires communication quality information for each location and each direction of communication from the quality information holding unit 112, and compares the communication quality information for each location with a communication quality requirement set for each direction of communication. For example, the communication quality evaluation unit 113 evaluates communication quality information such as throughput and communication delay for each location included in the candidate route, and determines whether the communication quality information satisfies the communication quality requirement, for each direction of communication. In a case where the quality information holding unit 112 holds communication quality for each time period, the communication quality evaluation unit 113 may predict a time when the moving body 200 passes through each location on the candidate route, and acquire communication quality information in the time period when the moving body 200 passes through each location. The communication quality evaluation unit 113 corresponds to the communication quality evaluation means 22 illustrated in FIG. 2.

The candidate route evaluation unit 114 evaluates communication stability of a candidate route by using communication quality of each location evaluated for each direction of communication. Herein, the communication stability is an index indicating a possibility that communication quality of a wireless communication network satisfies a communication quality requirement or a possibility that the communication quality of the wireless communication network does not satisfy the communication quality requirement. For example, the candidate route evaluation unit 114 evaluates, as communication stability, a ratio of a section in which the communication quality satisfies the communication quality requirement or a ratio of a section in which the communication quality does not satisfy the communication quality requirement in the entire route. The candidate route evaluation unit 114 evaluates, as a possibility of satisfying the communication quality requirement, a ratio of locations that satisfy both the communication quality requirement related to downlink communication and the communication quality requirement related to uplink communication, with respect to the candidate route. Alternatively or additionally, the candidate route evaluation unit 114 may evaluate, as a possibility of not satisfying the communication quality requirement, a ratio of locations that do not satisfy at least one of the communication quality requirement related to the downlink communication or the communication quality requirement related to the uplink communication, with respect to the candidate route. The candidate route evaluation unit 114 corresponds to the candidate route evaluation means 23 illustrated in FIG. 2.

For example, for each location, the communication quality evaluation unit 113 compares communication quality information of the uplink communication with the communication quality requirement of the uplink communication, and compares communication quality information of the downlink communication with the communication quality requirement of the downlink communication. When determining that the communication quality information does not satisfy, for a certain location, the communication quality requirement in at least one of the uplink communication or the downlink communication, the communication quality evaluation unit 113 determines that the location is a violation of the communication quality requirement. The candidate route evaluation unit 114 aggregates an evaluation result of the communication quality at each location included in the candidate route, that is, a determination result of the violation of the communication quality requirement, and calculates, for the candidate route, a violation rate of the communication quality requirement related to the communication speed, a violation rate of the communication quality requirement related to the communication delay, and the like.

Alternatively, when the communication quality information satisfies, for a certain location, the communication quality requirement in both the uplink communication and the downlink communication, the communication quality evaluation unit 113 determines that the location is a satisfaction of the communication quality requirement. The candidate route evaluation unit 114 aggregates an evaluation result of the communication quality at each location included in the candidate route, that is, a determination result of the satisfaction of the communication quality requirement, and calculates, for the candidate route, a satisfaction rate of the communication quality requirement related to the communication speed, a satisfaction rate of the communication quality requirement related to the communication delay, and the like.

In place of the above description, the candidate route evaluation unit 114 may evaluate the communication stability of the candidate route for each direction of communication, integrate the communication stability of the uplink communication and the communication stability of the downlink communication, and serve as the communication stability of the candidate route. For example, the communication quality evaluation unit 113 determines as a violation of the communication quality requirement of the uplink communication in a location where the communication quality information of the uplink communication does not satisfy the communication quality requirement of the uplink communication. Similarly, the communication quality evaluation unit 113 determines as a violation of the communication quality requirement of the downlink communication in a location where the communication quality information of the downlink communication does not satisfy the communication quality requirement of the downlink communication. For each of the uplink communication and the downlink communication, the candidate route evaluation unit 114 aggregates a determination result of the violation of the communication quality requirement at each location over the entire candidate route, and calculates, for the candidate route, a violation rate of the communication quality requirement related to the communication speed, a violation rate of the communication quality requirement related to the communication delay, and the like, for each direction of communication. The candidate route evaluation unit 114 may integrate the violation rate of the communication quality requirement of the uplink communication and the violation rate of the communication quality requirement of the downlink communication by, for example, weighted averaging. For example, when the violation rate of the communication quality requirement related to the communication speed is 0.1 for uplink communication and 0.2 for downlink communication, and the violation rate of the communication quality requirement of uplink communication and the violation rate of the communication quality requirement of downlink communication are equally weighted averaging, the violation rate of the communication quality requirement related to the communication speed on the candidate route becomes $(0.1+0.2)/2=0.15$.

Note that, although an example in which the violation rate of the communication quality requirement or the like is calculated for each type of pieces of communication quality for the candidate route has been described above, the present disclosure is not limited thereto. For each location included in the candidate route, the candidate route evaluation unit 114 determines whether each of the plurality of types of pieces of communication quality satisfies each of communication quality requirements, and determines as a satisfaction of the communication quality requirement for the location when the communication quality requirements are satisfied for all types of pieces of communication quality. Alternatively, for each location included in the candidate route, the candidate route evaluation unit 114 determines whether each of the plurality of types of pieces of communication quality satisfies each of communication quality requirements, and determines as a violation of the communication quality requirement for the location when the communication quality requirements are violated for any of the types of pieces of communication quality. The candidate route evaluation unit 114 may calculate the satisfaction rate of the communication quality requirement and the violation rate of the communication quality requirement of the entire candidate route, based on a determination result of the satisfaction of the communication quality requirement or the violation of the communication quality requirement at each location. In this case, the satisfaction rate of the communication quality requirement and the violation rate of the communication quality requirement do not depend on the number of types of pieces of communication quality, and serve as one index for each candidate route.

Herein, when the moving body 200 travels in a location with low communication quality, an influence thereof depends on a traveling speed of the moving body 200. For example, when the candidate route includes an out-of-range section of 10 m, a passing-through time of the out-of-range section is 360 milliseconds when the speed of the moving body 200 is 100 km/h (for example, an expressway). In this case, the remote monitoring apparatus 130 cannot receive a traveling video or the like from the moving body 200 for 360 milliseconds. On the other hand, when the speed of the moving body 200 is 10 km/h (for example, a residential area), the passing-through time of the out-of-range section is 3.6 seconds. In this case, the remote monitoring apparatus 130 cannot receive a traveling video or the like from the moving body 200 for 3.6 seconds. As described above, an influence of a section with poor communication quality on remote monitoring increases as the moving speed of the moving body 200 decreases.

In the present example embodiment, the candidate route evaluation unit 114 may predict a traveling speed at each location when the moving body 200 moves on a candidate route, and predict a required passing-through time at each location by using the predicted traveling speed. The candidate route evaluation unit 114 may predict the traveling speed at each location, based on information indicating a speed limit at each location, or the like. The candidate route evaluation unit 114 may predict the traveling speed at each location, based on an actual value of the traveling speed at each location. Alternatively, the candidate route evaluation unit 114 may predict the traveling speed at each location by using information such as road traffic congestion information.

The candidate route evaluation unit 114 may weight an evaluation result of the communication quality at each location by using the predicted required passing-through time. For example, the candidate route evaluation unit 114 may evaluate, as the communication stability, a ratio of a "required passing-through time of a section in which the communication quality satisfies the communication quality requirement" to a "required passing-through time of the entire candidate route". Alternatively, the candidate route evaluation unit 114 may evaluate, as the communication stability, a ratio of a "required passing-through time of a section in which the communication quality does not satisfy the communication quality requirement" to the "required passing-through time of the entire candidate route". For example, it is considered a case where, for a candidate route A and a candidate route B, a total length of sections (quality violation sections) that do not satisfy the communication quality requirement are both 1 km, and a length of the entire candidate route is both 10 km. It is assumed that, in the candidate route A, a traveling speed of 10 km/h is predicted in the quality violation section, and a traveling speed of 40 km/h is predicted in the other sections, and in the candidate route B, a traveling speed of 40 km/h is predicted in the entire route. In this case, for the candidate route A, the required passing-through time of the entire route is 19.5 minutes, the required passing-through time of the quality violation section is 6 minutes, and thereby the violation rate of the communication quality requirement becomes approximately 0.31. On the other hand, for the candidate route B, the required passing-through time of the entire route is 15 minutes, the required passing-through time of the quality violation section is 1.5 minutes, and thereby the violation rate of the communication quality requirement becomes 0.1.

The route determination unit 115 determines a route from among candidate routes, based on communication stability of each candidate route evaluated by the candidate route evaluation unit 114. The route determination unit 115 determines, as a movement route of the moving body 200, for example, a route having the shortest movement time or a route having the shortest movement distance while the communication stability satisfies a predetermined condition. The route determination unit 115 transmits information indicating the determined route to the moving body 200 via the network 150. The navigation apparatus 205 of the moving body 200 receives the information indicating the route as a response for a route search request. The navigation apparatus 205 displays the determined route on the display screen, and starts navigation. The route determination unit 115 corresponds to the route determination means 24 illustrated in FIG. 2.

The route determination unit 115 may cause a user or the like to select a route determination criterion, and determine a route by using the criterion selected by a user. For example, the route determination unit 115 may cause a user to select "communication priority", "time priority", or "distance priority". When a user selects "communication priority", the route determination unit 115 may determine, as the movement route, a route having the shortest movement time or a route having the shortest movement distance while the communication stability satisfies a predetermined condition. When a user selects "time priority" or "distance priority", the route determination unit 115 may determine the movement route without considering the communication stability. Alternatively, the route determination unit 115 may score each of an evaluation result of the communication stability, the movement time, and the movement distance, and determine the movement route by weighted adding them. The route determination unit 115 may change a weight of the weighted addition according to which of the communication stability, the movement time, and the movement distance a user prioritizes.

In place of determining a route, the route determination unit 115 may transmit the candidate route and the evaluation result of the communication stability in each candidate route to the moving body 200, and prompt a user to determine the route. In that case, the navigation apparatus 205 receives the candidate route and the evaluation result for the candidate route from the route providing apparatus 110 as a response for the route search request. The navigation apparatus 205 may display the candidate route and the evaluation result for the candidate route on the display screen, and prompt a user to select the route. When a user selects a route, the navigation apparatus 205 starts navigation.

Figure 8:
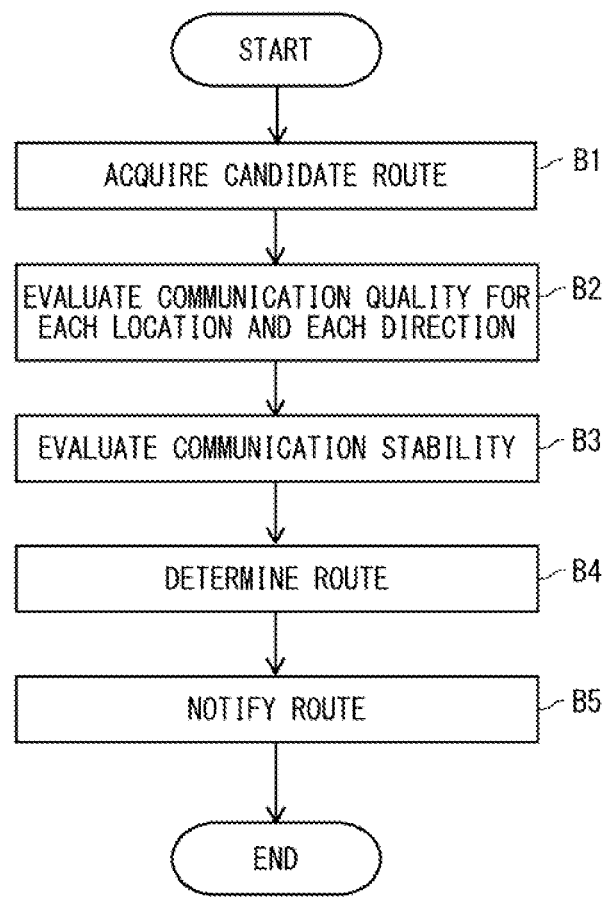
FIG. 8 is a flowchart illustrating an operation procedure of the route providing apparatus.

Subsequently, an operation procedure will be described. FIG. 8 illustrates the operation procedure (route providing method) of the route providing apparatus 110. The route providing apparatus 110 receives a route search request from the moving body 200. The candidate route acquisition unit 111 acquires, for example, a candidate (candidate route) of a route from a current position of the moving body 200 to a destination (step B1). In step B1, the candidate route acquisition unit 111 extracts a plurality of routes that can reach the destination from the current position by using, for example, an existing route search method. The candidate route acquisition unit 111 sorts a plurality of routes by a movement distance (route length) or a movement time, and extracts, as candidate routes, a predetermined number of routes having a shorter movement distance or movement time.

The communication quality evaluation unit 113 refers to the quality information holding unit 112, and evaluates communication quality for each location included in the candidate route and for each direction of communication (step B2). In step B2, the communication quality evaluation unit 113 compares communication quality information with a communication quality requirement for each direction of communication, for example, for a plurality of types of pieces of communication quality. The communication quality evaluation unit 113 may not evaluate the communication quality for a part of the plurality of types of pieces of communication quality for each direction of communication. In other words, the communication quality evaluation unit 113 may evaluate bidirectional communication quality of uplink communication and downlink communication by using the same type of communication quality, or may evaluate the communication quality by using different types of pieces of communication quality between the uplink communication and the downlink communication. For example, it may be evaluated whether the communication quality requirement is satisfied for a communication speed in the uplink communication and for a communication delay in the downlink communication. The candidate route evaluation unit 114 evaluates communication stability of each candidate route, based on an evaluation result of the communication quality for each location and for each direction of communication (step B3).

The route determination unit 115 determines a route, based on an evaluation result of the communication stability of the candidate route (step B4). For example, in step B4, the route determination unit 115 compares the communication stability of each candidate route with a predetermined threshold value. The route determination unit 115 determines, as a movement route of the moving body 200, a candidate route having the shortest movement time or movement distance among the candidate routes whose communication stability is equal to or more than the threshold value or equal to or less than the threshold value. For example, the route determination unit 115 determines, as a movement route of the moving body 200, a candidate route having a satisfaction rate of the communication quality requirement of 95% or more or a candidate route having a violation rate of the communication quality requirement of less than 5%. The route determination unit 115 may calculate a score for each candidate route, based on the communication stability, the movement time, and the movement distance, and determine the route, based on the score.

The route determination unit 115 notifies the moving body 200 of information indicating the determined route (step B5). The navigation apparatus 205 of the moving body 200 displays a route on a display screen. Alternatively, the route determination unit 115 may transmit, to the moving body 200, the candidate route and the evaluation result of the communication stability for the candidate route. In the moving body 200, the navigation apparatus 205 may display the evaluation result of each candidate route and cause a user to select a movement route.

Figure 9:
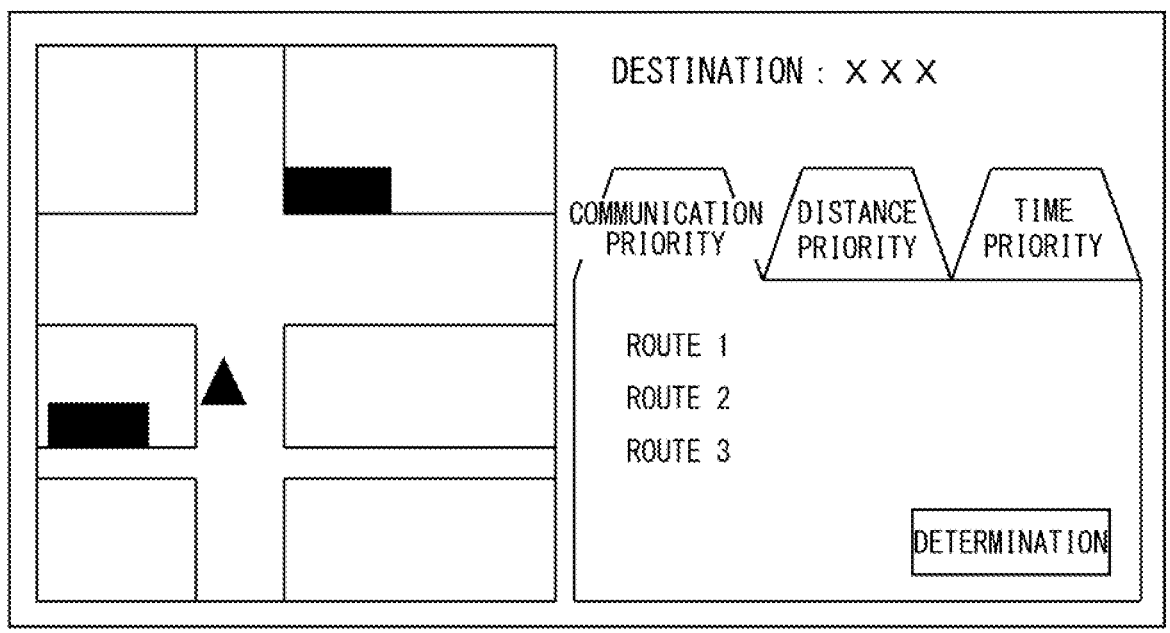
FIG. 9 is a diagram illustrating a display example of a navigation apparatus.

FIG. 9 illustrates a display example of the navigation apparatus 205. Herein, it is assumed that a user selects "communication priority". The navigation apparatus 205 displays a "route 1", a "route 2", and a "route 3" as candidates of the movement route to a destination "XXX". A user can select the "route 1", the "route 2", or the "route 3", and view detailed information of the selected route.

Figure 10:
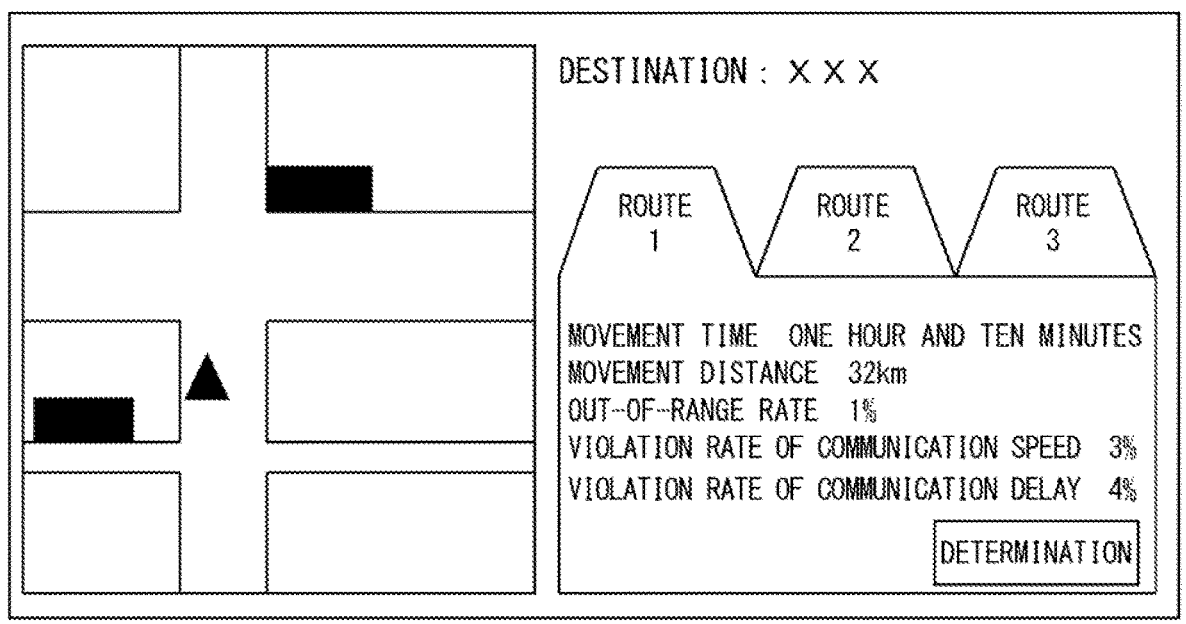
FIG. 10 is a diagram illustrating a display example when a user selects a "route 1"

FIG. 10 illustrates a display example when a user selects the "route 1". When a user selects the "route 1", the navigation apparatus 205 displays the movement time, the movement distance, the evaluation result of the communication stability, and the like of the "route 1". In the example in FIG. 10, the navigation apparatus 205 displays an "out-of-range rate", a "violation rate of communication speed", and a "violation rate of communication delay" as evaluation results of the communication stability. When a user selects "determination", the navigation apparatus 205 starts guiding the route selected by a user.

Figure 11:
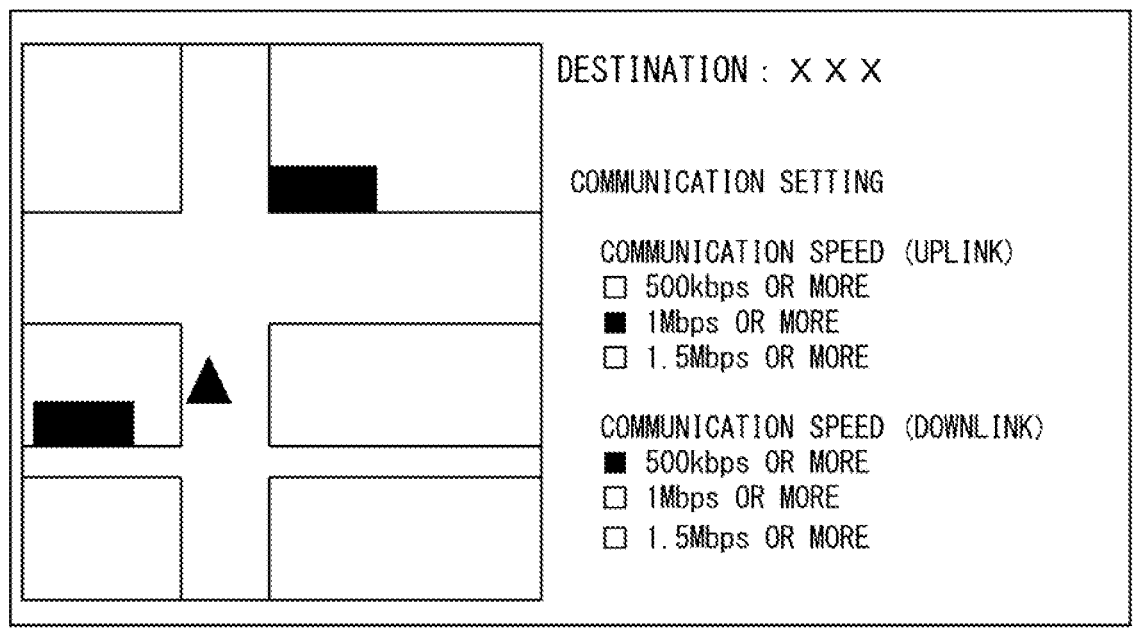
FIG. 11 is a diagram illustrating an example of a screen for setting a communication quality requirement.

A user may be able to set a communication quality requirement to be compared with communication quality information by the communication quality evaluation unit 113 by using the navigation apparatus 205. FIG. 11 illustrates an example of a screen for setting a communication quality requirement. A user can set the communication quality requirement for each direction of communication with respect to the communication speed. For example, when a user selects "1 mega bit per second (Mbps) or more" for the communication speed of the uplink communication, the communication quality evaluation unit 113 determines whether the communication speed of the uplink communication at each location is 1 Mbps or more. When a user selects "500 kbps or more" for the communication speed of the downlink communication, the communication quality evaluation unit 113 determines whether the communication speed of the downlink communication at each location is 500 kbps or more. In a case of a setting example illustrated in FIG. 11, the communication quality evaluation unit 113 determines that the communication quality requirement is satisfied in a case where the communication speed at each location satisfies both of 1 Mbps or more for the uplink communication and 500 kbps or more for the downlink communication, and the communication quality requirement is violated in other cases. Further, the candidate route evaluation unit 114 calculates a satisfaction rate of the communication quality requirement or a violation rate of the communication quality requirement related to the communication speed for each candidate route.

In the present example embodiment, the communication quality evaluation unit 113 evaluates communication quality of each location included in a candidate route for each direction of communication. The candidate route evaluation unit 114 evaluates communication stability of the candidate route by using communication quality evaluated for each direction of communication. In remote monitoring of the moving body 200 by the remote monitoring apparatus 130, a required communication quality requirement may be different between uplink communication and downlink communication. In the present example embodiment, it is possible to determine a movement route of the moving body 200 in consideration of a difference in communication characteristics between the uplink communication and the downlink communication. Therefore, the route providing apparatus 110 can provide the moving body 200 with a route being capable of stably performing the uplink communication and the downlink communication.

In the present example embodiment, the communication quality evaluation unit 113 predicts a time when the moving body 200 passes through each location. The communication quality evaluation unit 113 acquires communication quality information at the time when the moving body 200 passes through each location from the quality information holding unit 112, and compares the acquired communication quality information with a communication quality requirement. The communication quality is influenced by a congestion degree of a base station of the wireless communication network, and good communication quality is easily acquired at a time in idle compared with a time in congesting. In the present example embodiment, the communication quality information at a time when the moving body 200 is predicted to pass through each location is used for evaluation of the communication quality. Therefore, the candidate route evaluation unit 114 can evaluate the communication stability of the candidate route in consideration of time characteristic of the communication quality.

although an example in which the candidate route acquisition unit 111 extracts a candidate route has been described in the above-described example embodiment, the present disclosure is not limited thereto. For example, the candidate route may be extracted at the navigation apparatus 205 of the moving body 200. In that case, the candidate route acquisition unit 111 may acquire the candidate route from the navigation apparatus 205 via the network 150. Alternatively, the candidate route acquisition unit 111 may request an external server to search for the candidate route, and acquire the candidate route from the external server. Alternatively, the candidate route may be extracted in the automatic driving ECU of the moving body 200. In that case, the candidate route acquisition unit 111 may acquire the candidate route from the automatic driving ECU via the network 150.

In addition, although an example in which the route providing apparatus 110 includes the quality information holding unit 112 has been described above, the present disclosure is not limited thereto. The quality information holding unit 112 need only be accessible from the route providing apparatus 110, and need not necessarily be disposed inside the route providing apparatus 110. For example, the communication quality evaluation unit 113 may acquire the communication quality information from an external server via a network, and evaluate the communication stability of the candidate route.

although an example in which the navigation apparatus 205 is used for a route display or the like has been described in the above-described example embodiment, the present disclosure is not limited thereto. In place of the navigation apparatus 205, an apparatus such as a display audio (DA) may be used. An apparatus on which the route or the like is displayed needs not necessarily be an in-vehicle apparatus, and may be an apparatus such as a smartphone or a tablet terminal held by a user. In addition, the route determined by the route determination unit 115 needs not necessarily be displayed to a user, and may be input to an apparatus such as the automatic driving ECU 204. For example, the moving body 200 may acquire the route determined by the route determination unit 115 by the reception unit 208, and input the acquired route to the automatic driving ECU 204. In this case, the automatic driving ECU 204 can perform automatic traveling along the acquired route.

Figure 12:
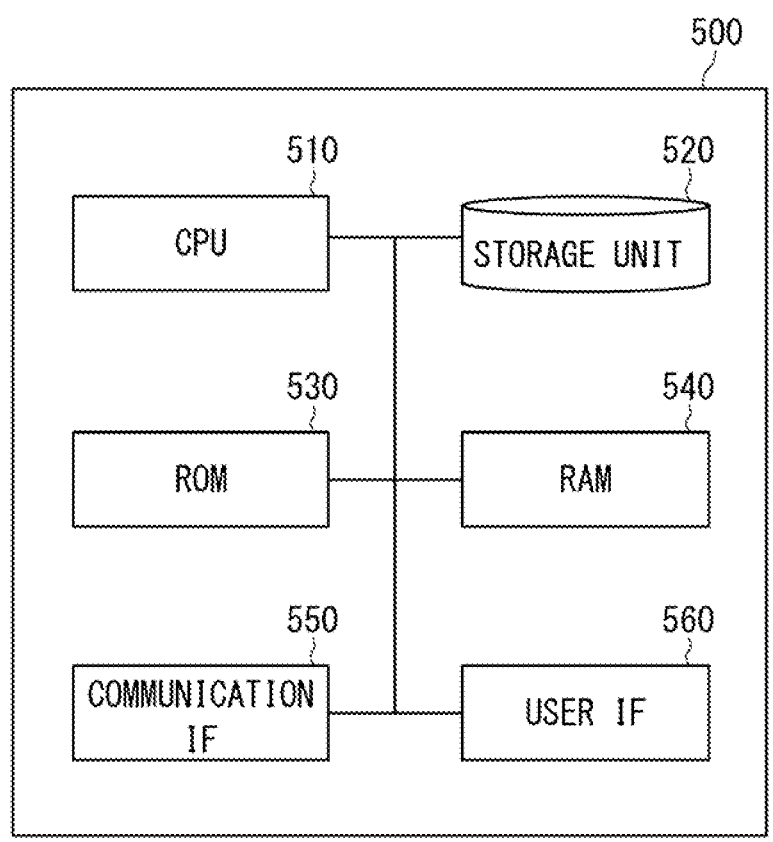
FIG. 12 is a block diagram illustrating a configuration example of a computer apparatus.

In the present disclosure, the route providing apparatus 110 and the remote monitoring apparatus 130 may be configured by using a computer apparatus. FIG. 12 illustrates a configuration example of a computer apparatus that may be used for the route providing apparatus 110 and the remote monitoring apparatus 130. A computer apparatus 500 includes a control unit (central processing unit (CPU)) 510, a storage unit 520, a read only memory (ROM) 530, a random access memory (RAM) 540, a communication interface (IF) 550, and a user interface 560.

The communication interface 550 is an interface for connecting the computer apparatus 500 and a communication network via a wired communication means, a wireless communication means, or the like. The user interface 560 includes a display unit such as a display. In addition, the user interface 560 includes an input unit such as a keyboard, a mouse, and a touch panel.

The storage unit 520 is an auxiliary storage device being capable of holding various pieces of data. The storage unit 520 needs not necessarily be a part of the computer apparatus 500, and may be an external storage device or a cloud storage connected to the computer apparatus 500 via a network.

The ROM 530 is a non-volatile storage device. For example, a semiconductor memory device such as a flash memory having a relatively small capacity is used for the ROM 530. A program executed by the CPU 510 may be stored in the storage unit 520 or the ROM 530. The storage unit 520 or the ROM 530 stores various programs for achieving a function of each unit in the route providing apparatus 110 or the remote monitoring apparatus 130, for example.

The program described above can be stored by using various types of non-transitory computer readable media, and supplied to the computer apparatus 500. The non-transitory computer readable medium includes various types of tangible storage media. Examples of the non-transitory computer readable medium include a magnetic recording medium such as, for example, a flexible disk, a magnetic tape, or a hard disk, a magneto-optical recording medium such as, for example, a magneto-optical disk, an optical disk medium such as a compact disc (CD) or a digital versatile disk (DVD), and a semiconductor memory such as a mask ROM, a programmable ROM (PROM), an erasable PROM (EPROM), a flash ROM, or a RAM. In addition, the program may also be supplied to a computer by using various types of transitory computer readable media. Examples of the transitory computer readable medium include an electric signal, an optical signal, and an electromagnetic wave. The transitory computer readable medium can supply the program to the computer via a wired communication path such as an electric wire and an optical fiber, or a wireless communication path.

The RAM 540 is a volatile storage device. Various semiconductor memory devices such as a dynamic random access memory (DRAM) or a static random access memory (SRAM) are used for the RAM 540. The RAM 540 may be used as an internal buffer for temporarily storing data and the like. The CPU 510 extracts a program stored in the storage unit 520 or the ROM 530 into the RAM 540, and executes the program. By executing the program by the CPU 510, the function of each unit in the route providing apparatus 110 or the remote monitoring apparatus 130 may be achieved. The CPU 510 may include an internal buffer capable of temporarily storing data and the like.

While the example embodiment of the present disclosure has been described in detail above, the present disclosure is not limited to the above-described example embodiment, and change and modification to the above-described example embodiment without departing from the spirit of the present disclosure are also included in the present disclosure.

For example, some or all of the above-described example embodiment may be described as supplementary notes below, but are not limited thereto.

[Supplementary Note 1]

A route providing apparatus comprising:

candidate route acquisition means for acquiring, with respect to a moving body that receives data from a server and transmits data to the server via a wireless communication network, a candidate route of the moving body to a destination;

communication quality evaluation means for evaluating communication quality of the wireless communication network at each location included in the candidate route for each direction of communication by using communication quality information for each direction of communication;

candidate route evaluation means for evaluating communication stability of the candidate route by using communication quality being evaluated for each direction of the communication; and route determination means for determining a movement route of the moving body from among the candidate routes by using an evaluation result of the communication stability.

[Supplementary Note 2]

The route providing apparatus according to Supplementary Note 1, wherein the communication quality evaluation means performs evaluation for each direction of communication by comparing communication quality information for each location and each direction of the communication with a communication quality requirement being determined for each direction of the communication.

[Supplementary Note 3]

The route providing apparatus according to Supplementary Note 2, wherein the communication stability is an index, related to the candidate route, indicating a possibility that communication quality of the wireless communication network satisfies the communication quality requirement or a possibility that communication quality of the wireless communication network does not satisfy the communication quality requirement.

[Supplementary Note 4]

The route providing apparatus according to Supplementary Note 3, wherein a direction of the communication includes downlink communication from the server to the moving body and uplink communication from the moving body to the server, the communication quality evaluation means evaluates, for each location included in the candidate route, whether the communication quality requirement related to the downlink communication is satisfied, and whether the communication quality requirement related to the uplink communication is satisfied, and the candidate route evaluation means evaluates, as a possibility of satisfying the communication quality requirement, for the candidate route, a ratio of a location satisfying both the communication quality requirement related to the downlink communication and the communication quality requirement related to the uplink communication, and/or evaluates, as a possibility of not satisfying the communication quality requirement, for the candidate route, a ratio of a location not satisfying at least one of the communication quality requirement related to the downlink communication or the communication quality requirement related to the uplink communication.

[Supplementary Note 5]

The route providing apparatus according to any one of Supplementary Notes 1 to 4, wherein the communication quality evaluation means predicts a time when the moving body travels at each location included in the candidate route, and evaluates the communication quality by using communication quality information in a time period associated to the predicted time.

[Supplementary Note 6]

The route providing apparatus according to any one of Supplementary Notes 1 to 5, wherein the candidate route evaluation means predicts a traveling speed of the moving body at each location included in the candidate route, predicts a required passing-through time of each location by using the predicted traveling speed, weights an evaluation result of the communication quality for each location, based on the predicted required passing-through time, and evaluates communication stability of the candidate route.

[Supplementary Note 7]

The route providing apparatus according to any one of Supplementary Notes 1 to 6, wherein the communication quality information indicates a measurement value or an analysis value related to at least one of radio quality, a communication speed, a communication delay, a packet loss rate, or a jitter in the wireless communication network.

[Supplementary Note 8]

A remote monitoring system comprising:

a remote monitoring apparatus configured to transmit data to a moving body and receive data from the moving body via a wireless communication network; and a route providing apparatus configured to provide a movement route to the moving body, wherein the route providing apparatus includes candidate route acquisition means for acquiring a candidate route of the moving body to a destination, communication quality evaluation means for evaluating communication quality of the wireless communication network at each location included in the candidate route for each direction of communication by using communication quality information for each direction of communication, candidate route evaluation means for evaluating communication stability of the candidate route by using communication quality being evaluated for each direction of the communication, and route determination means for determining a movement route of the moving body from among the candidate routes by using an evaluation result of the communication stability.

[Supplementary Note 9]

The remote monitoring system according to Supplementary Note 8, wherein the communication quality evaluation means performs evaluation for each direction of communication by comparing communication quality information for each location and each direction of the communication with a communication quality requirement being determined for each direction of the communication.

[Supplementary Note 10]

The remote monitoring system according to Supplementary Note 9, wherein the communication stability is an index, related to the candidate route, indicating a possibility that communication quality of the wireless communication network satisfies the communication quality requirement or a possibility that communication quality of the wireless communication network does not satisfy the communication quality requirement.

[Supplementary Note 11]

The remote monitoring system according to Supplementary Note 10, wherein a direction of the communication includes downlink communication from the remote monitoring apparatus to the moving body and uplink communication from the moving body to the remote monitoring apparatus, the communication quality evaluation means evaluates, for each location included in the candidate route, whether the communication quality requirement related to the downlink communication is satisfied, and whether the communication quality requirement related to the uplink communication is satisfied, and the candidate route evaluation means evaluates, as a possibility of satisfying the communication quality requirement, for the candidate route, a ratio of a location satisfying both the communication quality requirement related to the downlink communication and the communication quality requirement related to the uplink communication, and/or evaluates, as a possibility of not satisfying the communication quality requirement, for the candidate route, a ratio of a location not satisfying at least one of the communication quality requirement related to the downlink communication or the communication quality requirement related to the uplink communication.

[Supplementary Note 12]

The remote monitoring system according to any one of Supplementary Notes 8 to 11, wherein the communication quality evaluation means predicts a time when the moving body travels at each location included in the candidate route, and evaluates the communication quality by using communication quality information in a time period associated to the predicted time.

[Supplementary Note 13]

The remote monitoring system according to any one of Supplementary Notes 9 to 12, wherein the candidate route evaluation means predicts a traveling speed of the moving body at each location included in the candidate route, predicts a required passing-through time of each location by using the predicted traveling speed, weights an evaluation result of the communication quality for each location, based on the predicted required passing-through time, and evaluates communication stability of the candidate route.

[Supplementary Note 14]

The remote monitoring system according to any one of Supplementary Notes 8 to 13, wherein the communication quality information indicates a measurement value or an analysis value related to at least one of radio quality, a communication speed, a communication delay, a packet loss rate, or a jitter in the wireless communication network.

[Supplementary Note 15]

A route providing method comprising:

acquiring, with respect to a moving body that receives data from a server and transmits data to the server via a wireless communication network, a candidate route of the moving body to a destination;

evaluating communication quality of the wireless communication network at each location included in the candidate route for each direction of communication by using communication quality information for each direction of communication;

evaluating communication stability of the candidate route by using communication quality being evaluated for each direction of the communication; and determining a movement route of the moving body from among the candidate routes by using an evaluation result of the communication stability.

[Supplementary Note 16]

The route providing method according to Supplementary Note 15, wherein, in evaluation of the communication quality, evaluation for each direction of communication is performed by comparing communication quality information for each location and each direction of the communication with a communication quality requirement being determined for each direction of the communication.

[Supplementary Note 17]

The route providing method according to Supplementary Note 16, wherein the communication stability is an index, related to the candidate route, indicating a possibility that communication quality of the wireless communication network satisfies the communication quality requirement or a possibility that communication quality of the wireless communication network does not satisfy the communication quality requirement.

[Supplementary Note 18]

The route providing method according to Supplementary Note 17, wherein a direction of the communication includes downlink communication from the server to the moving body and uplink communication from the moving body to the server, in evaluation of the communication quality, for each location included in the candidate route, whether the communication quality requirement related to the downlink communication is satisfied, and whether the communication quality requirement related to the uplink communication is satisfied are evaluated, and, in evaluation of the candidate route, for the candidate route, a ratio of a location satisfying both the communication quality requirement related to the downlink communication and the communication quality requirement related to the uplink communication is evaluated as a possibility of satisfying the communication quality requirement, and/or, for the candidate route, a ratio of a location not satisfying at least one of the communication quality requirement related to the downlink communication or the communication quality requirement related to the uplink communication is evaluated as a possibility of not satisfying the communication quality requirement.

[Supplementary Note 19]

The route providing method according to any one of Supplementary Notes 15 to 18, wherein, in evaluation of the communication quality, a time when the moving body travels at each location included in the candidate route is predicted, communication quality information in a time period associated to the predicted time is acquired, and the communication quality is evaluated by using the acquired communication quality information.

[Supplementary Note 20]

The route providing method according to any one of Supplementary Notes 15 to 19, wherein, in evaluation of the communication stability, a traveling speed of the moving body at each location included in the candidate route is predicted, a required passing-through time of each location is predicted by using the predicted traveling speed, an evaluation result of the communication stability for each location is weighted based on the predicted required passing-through time, and communication stability of the candidate route is evaluated.

[Supplementary Note 21]

The route providing method according to any one of Supplementary Notes 15 to 20, wherein the communication quality information indicates a measurement value or an analysis value related to at least one of radio quality, a communication speed, a communication delay, a packet loss rate, or a jitter in the wireless communication network.

[Supplementary Note 22]

A non-transitory computer readable medium storing a program for causing a computer to execute processing of:
  acquiring, with respect to a moving body that receives data from a server and transmits data to the server via a wireless communication network, a candidate route of the moving body to a destination;
  evaluating communication quality of the wireless communication network at each location included in the candidate route for each direction of communication by using communication quality information for each direction of communication;
  evaluating communication stability of the candidate route by using communication quality being evaluated for each direction of the communication; and
  determining a movement route of the moving body from among the candidate routes by using an evaluation result of the communication stability.

REFERENCE SIGNS LIST

10: REMOTE MONITORING SYSTEM
20: ROUTE PROVIDING APPARATUS
21: CANDIDATE ROUTE ACQUISITION MEANS
22: COMMUNICATION QUALITY EVALUATION MEANS
23: CANDIDATE ROUTE EVALUATION MEANS
24: ROUTE DETERMINATION MEANS
30: REMOTE MONITORING APPARATUS
40: MOVING BODY
50: WIRELESS COMMUNICATION NETWORK
100: REMOTE MONITORING SYSTEM
110: ROUTE PROVIDING APPARATUS
111: CANDIDATE ROUTE ACQUISITION UNIT
112: QUALITY INFORMATION HOLDING UNIT
113: COMMUNICATION QUALITY EVALUATION UNIT
114: CANDIDATE ROUTE EVALUATION UNIT
115: ROUTE DETERMINATION UNIT
130: REMOTE MONITORING APPARATUS
131: INFORMATION RECEPTION UNIT
132: MONITORING SCREEN DISPLAY UNIT
133: REMOTE CONTROL UNIT
150: NETWORK
200: MOVING BODY
201: PERIPHERAL MONITORING SENSOR
202: VEHICLE SENSOR
203: VEHICLE CONTROL ECU
204: AUTOMATIC DRIVING ECU
205: NAVIGATION APPARATUS
206: COMMUNICATION APPARATUS
207: TRANSMISSION UNIT
208: RECEPTION UNIT
500: COMPUTER APPARATUS
510: CPU
520: STORAGE UNIT
530: ROM
540: RAM
550: COMMUNICATION INTERFACE
560: USER INTERFACE

What is claimed is:

1. A route providing apparatus comprising:
at least one memory storing instructions; and
at least one processor configured to execute the instructions to:
  acquire, with respect to a moving body that receives data from a server and transmits data to the server via a wireless communication network, a candidate route of the moving body to a destination;
  evaluate communication quality of the wireless communication network in the candidate route for each of two directions of communication by using communication quality information for each of the two directions of communication; and
  evaluate communication stability of the candidate route by using communication quality being evaluated for each of the two directions of communication,
  wherein the two directions of communication include downlink communication from the server to the moving body and uplink communication from the moving body to the server.

2. The route providing apparatus according to claim 1, wherein the at least one processor is configured to execute the instructions to perform evaluation for each of the two directions of communication by comparing communication quality information for a location and each of the two directions of communication with a communication quality requirement being determined for each of the two directions of communication.

3. The route providing apparatus according to claim 2, wherein the communication stability is an index, related to the candidate route, indicating a possibility that communication quality of the wireless communication network satisfies the communication quality requirement or a possibility that communication quality of the wireless communication network does not satisfy the communication quality requirement.

4. The route providing apparatus according to claim 3, wherein
the at least one processor is configured to execute the instructions to:
  evaluate, for a location included in the candidate route, whether the communication quality requirement related to the downlink communication is satisfied, and whether the communication quality requirement related to the uplink communication is satisfied; and
  evaluate, as a possibility of satisfying the communication quality requirement, for the candidate route, a ratio of a location satisfying both the communication quality requirement related to the downlink communication and the communication quality requirement related to the uplink communication, and/or evaluate, as a possibility of not satisfying the communication quality requirement, for the candidate route, a ratio of a location not satisfying at least one of the communication quality requirement related to the downlink communication or the communication quality requirement related to the uplink communication.

5. The route providing apparatus according to claim 1, wherein the at least one processor is configured to execute the instructions to predict a time when the moving body travels in the candidate route, and evaluate the communication quality by using communication quality information in a time period associated to the predicted time.

6. The route providing apparatus according to claim 1, wherein the at least one processor is configured to execute the instructions to predict a traveling speed of the moving body in the candidate route, predict a required passing-through time of a location by using the predicted traveling speed, weight an evaluation result of the communication quality for a location, based on the predicted required passing-through time, and evaluate communication stability of the candidate route.

7. The route providing apparatus according to claim 1, wherein the communication quality information indicates a measurement value or an analysis value related to at least one of radio quality, a communication speed, a communication delay, a packet loss rate, or a jitter in the wireless communication network.

8. The route providing apparatus according to claim 1, wherein the at least one processor is configured to execute the instructions to:
determine a movement route of the moving body from among the candidate routes by using an evaluation result of the communication stability.

9. The route providing apparatus according to claim 1, wherein the at least one processor is configured to transmit the candidate route and the evaluation result of the communication stability in each candidate route to the moving body.

10. A remote monitoring system comprising:
a remote monitoring apparatus comprising at least one memory storing instructions and at least one processor configured to execute the instructions to transmit data to a moving body and receive data from the moving body via a wireless communication network; and
a route providing apparatus configured to provide a movement route to the moving body, wherein the route providing apparatus comprises:
at least one memory storing instructions; and
at least one processor configured to execute the instructions to:
acquire a candidate route of the moving body to a destination;
evaluate communication quality of the wireless communication network in the candidate route for each of two directions of communication by using communication quality information for each of the two directions of communication; and
evaluate communication stability of the candidate route by using communication quality being evaluated for each of the two directions of communication,
wherein the two directions of communication include downlink communication from the server to the moving body and uplink communication from the moving body to the server.

11. The remote monitoring system according to claim 10, wherein the at least one processor of the route providing apparatus is configured to perform evaluation for each of the two directions of communication by comparing communication quality information for a location and each of the two directions of communication with a communication quality requirement being determined for each of the two directions of communication.

12. The remote monitoring system according to claim 11, wherein the communication stability is an index, related to the candidate route, indicating a possibility that communication quality of the wireless communication network satisfies the communication quality requirement or a possibility that communication quality of the wireless communication network does not satisfy the communication quality requirement.

13. The remote monitoring system according to claim 12, wherein
the at least one processor of the route providing apparatus is configured to execute the instructions to:
evaluate, for a location included in the candidate route, whether the communication quality requirement related to the downlink communication is satisfied, and whether the communication quality requirement related to the uplink communication is satisfied; and
evaluate, as a possibility of satisfying the communication quality requirement, for the candidate route, a ratio of a location satisfying both the communication quality requirement related to the downlink communication and the communication quality requirement related to the uplink communication, and/or evaluate, as a possibility of not satisfying the communication quality requirement, for the candidate route, a ratio of a location not satisfying at least one of the communication quality requirement related to the downlink communication or the communication quality requirement related to the uplink communication.

14. The remote monitoring system according to claim 10, wherein the at least one processor of the route providing apparatus is configured to execute the instructions to predict a time when the moving body travels in the candidate route, and evaluate the communication quality by using communication quality information in a time period associated to the predicted time.

15. The remote monitoring system according to claim 10, wherein the at least one processor of the route providing apparatus is configured to execute the instructions to predict a traveling speed of the moving body in the candidate route, predict a required passing-through time of a location by using the predicted traveling speed, weight an evaluation result of the communication quality for a location, based on the predicted required passing-through time, and evaluate communication stability of the candidate route.

16. The remote monitoring system according to claim 10, wherein the communication quality information indicates a measurement value or an analysis value related to at least one of radio quality, a communication speed, a communication delay, a packet loss rate, or a jitter in the wireless communication network.

17. A route providing method comprising:
acquiring, with respect to a moving body that receives data from a server and transmits data to the server via a wireless communication network, a candidate route of the moving body to a destination;
evaluating communication quality of the wireless communication network in the candidate route for each of two directions of communication by using communication quality information for each of the two directions of communication; and
evaluating communication stability of the candidate route by using communication quality being evaluated for each of the two directions of communication;
wherein the two directions of communication include downlink communication from the server to the moving body and uplink communication from the moving body to the server.

18. The route providing method according to claim 17, wherein, in evaluation of the communication quality, evaluation for each of the two directions of communication is performed by comparing communication quality information for a location and each of the two directions of communication with a communication quality requirement being determined for each direction of the communication.

19. The route providing method according to claim 18, wherein the communication stability is an index, related to the candidate route, indicating a possibility that communication quality of the wireless communication network satisfies the communication quality requirement or a possibility that communication quality of the wireless communication network does not satisfy the communication quality requirement.

20. The route providing method according to claim 19, wherein
   in evaluation of the communication quality, for a location included in the candidate route, whether the communication quality requirement related to the downlink communication is satisfied, and whether the communication quality requirement related to the uplink communication is satisfied are evaluated, and,
   in evaluation of the candidate route, for the candidate route, a ratio of a location satisfying both the communication quality requirement related to the downlink communication and the communication quality requirement related to the uplink communication is evaluated as a possibility of satisfying the communication quality requirement, and/or, for the candidate route, a ratio of a location not satisfying at least one of the communication quality requirement related to the downlink communication or the communication quality requirement related to the uplink communication is evaluated as a possibility of not satisfying the communication quality requirement.

21. The route providing method according to claim 17, wherein, in evaluation of the communication quality, a time when the moving body travels in the candidate route is predicted, communication quality information in a time period associated to the predicted time is acquired, and the communication quality is evaluated by using the acquired communication quality information.

22. The route providing method according to claim 17, wherein, in evaluation of the communication stability, a traveling speed of the moving body in the candidate route is predicted, a required passing-through time of a location is predicted by using the predicted traveling speed, an evaluation result of the communication quality for a location is weighted based on the predicted required passing-through time, and communication stability of the candidate route is evaluated.

* * * * *